United States Patent [19]

Stekly et al.

[11] 4,344,057
[45] Aug. 10, 1982

[54] TRANSVERSE MAGNETIC LOAD CONTAINMENT STRUCTURE FOR USE IN MHD MAGNETS

[75] Inventors: Zdenek J. J. Stekly, Wayland; Robert D. Pillsbury, Jr., Natick, both of Mass.

[73] Assignee: Magnetic Corporation of America, Waltham, Mass.

[21] Appl. No.: 115,935

[22] Filed: Jan. 28, 1980

[51] Int. Cl.³ ............................................... H01F 5/00
[52] U.S. Cl. ........................................ 335/299; 310/11
[58] Field of Search .......................... 335/299; 310/11; 336/207, 208

[56] References Cited

U.S. PATENT DOCUMENTS

| | | | |
|---|---|---|---|
| 3,161,788 | 12/1964 | Russell | 310/11 |
| 3,161,807 | 12/1964 | Brogan et al. | 335/299 |
| 3,271,597 | 9/1966 | Way | 310/11 |

*Primary Examiner*—Harold Broome
*Attorney, Agent, or Firm*—Reed, Smith, Shaw & McClay

[57] ABSTRACT

This invention relates to means for the structural support of the windings of saddle and racetrack-shaped magnets against the local magnetic loads acting on the individual conductors or against the total transverse magnetic loads acting on the entire windings. The invention is particularly useful in magnets used in magnetohydrodynamic [MHD] applications. The invention utilizes the inherent stiffness of the windings themselves and any internal or substructure present within the windings. The invention comprises a pair of first and second winding assemblies, an assembly of each pair being positioned on each side of the MHD channel. Each winding assembly consists either of an integral winding pancake or one or more substructural plates, each of which has a channel or channels running its length and into which an individual conductor or several conductors of the magnet are placed. Winding pancakes or plates are assembled with a means to provide shear transmission from pancake to pancake or from plate to plate. This may be done by the use of keys and keyways, bolts, friction or the bond strength of adhesives or epoxies. The two sets of winding assemblies are joined across the MHD channel by a tension member (plates or bolts) and a means to transmit shear from the winding assembly to the tension member. There may also be an additional tension member within each winding assembly preventing the two winding halves and their components on each side of the MHD channel from separating under the magnetic loads.

19 Claims, 8 Drawing Figures

FIG. I

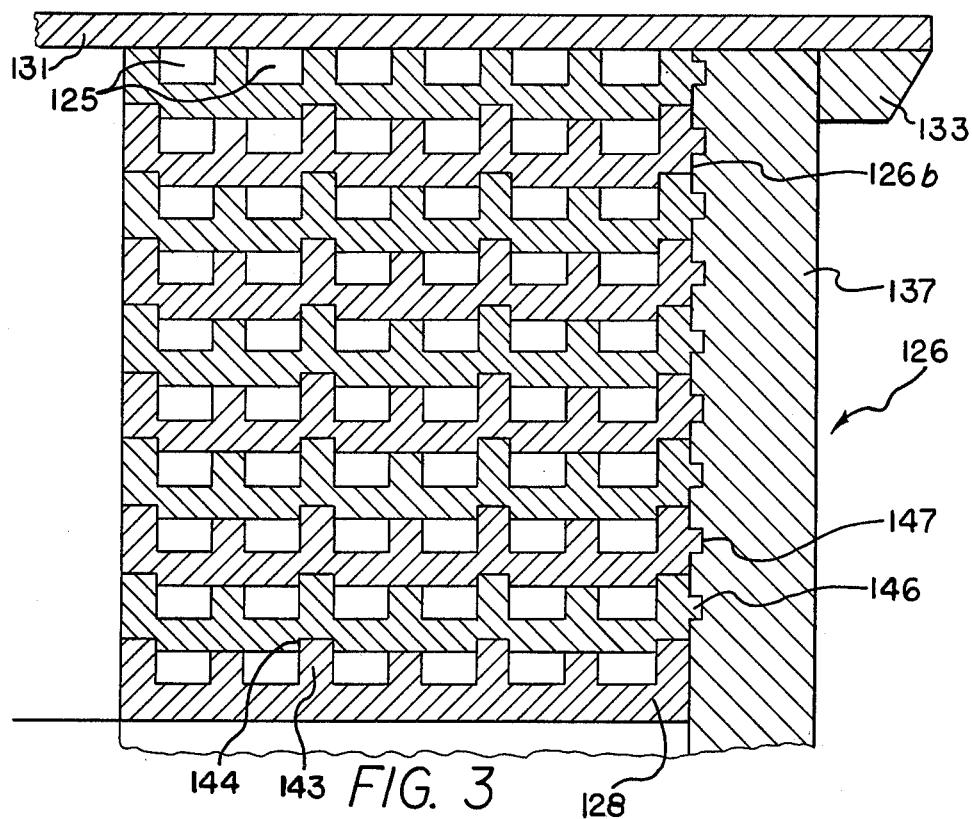
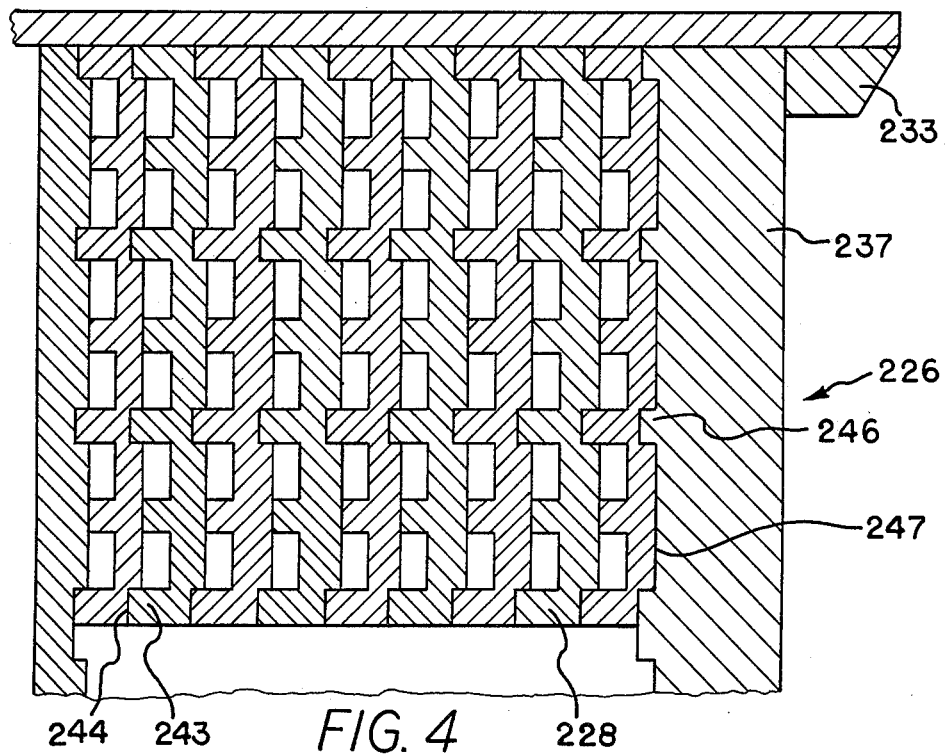

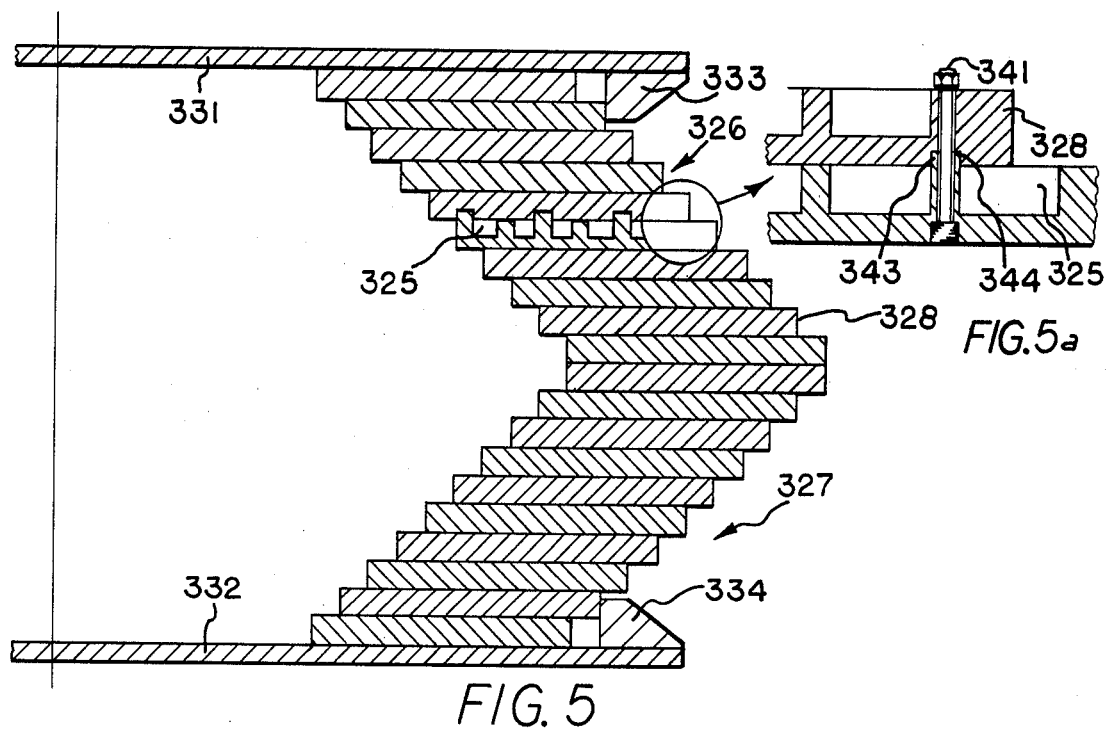
FIG. 5
FIG. 5a
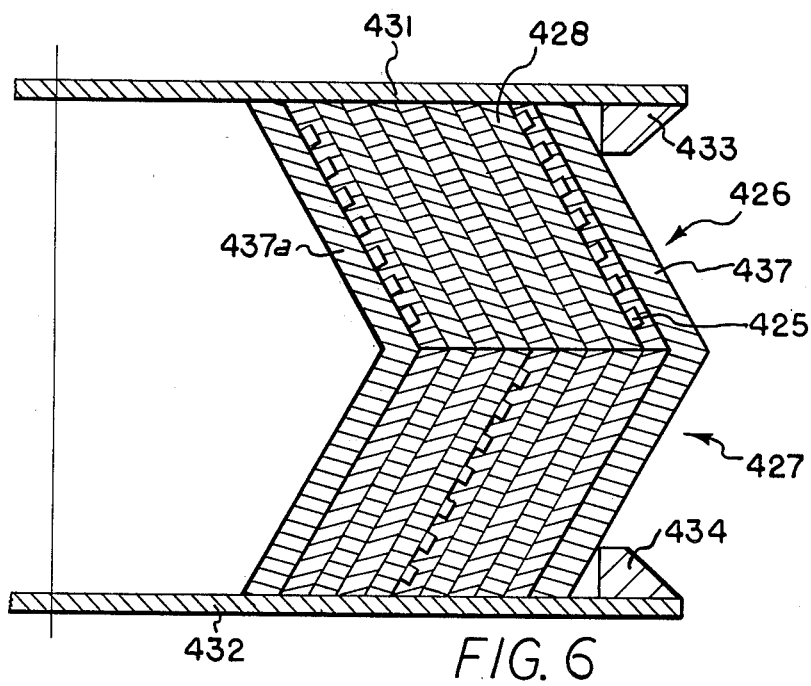
FIG. 6

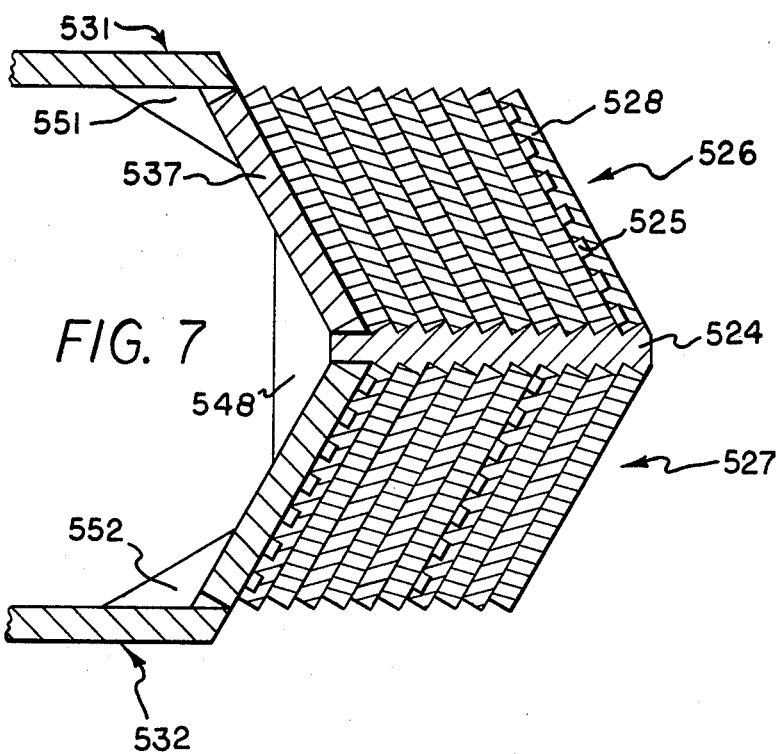

TRANSVERSE MAGNETIC LOAD CONTAINMENT STRUCTURE FOR USE IN MHD MAGNETS

FIELD OF INVENTION

The invention relates to a means for constraining against movement due to magnetic loads, the coil winding of a saddle or racetrack magnet, and in particular to a containment structure for the coil windings of a superconducting saddle or racetrack magnet.

BACKGROUND OF THE INVENTION

Magnetohydrodynamic (MHD) power involves a system for directly generating electrical energy from an electrically conducting fluid such as an ionized gas as it passes through a magnetic field. The MHD system typically comprises a channel through which ionized gas flows and a magnetic field that is transverse to the axial flow of the gas. It has been determined that in order to efficiently and economically operate such a system magnetic fields of at least from 3 to 7 Weber/meter$^2$ are desirable. In order to obtain such magnetic fields the use of superconducting magnets (those cooled to about 4° K.) are necessary (Z. J. J. Stekly and R. J. Thome, Proceedings of the IEEE, Volume 61, 1973, pages 85–95).

In order to generate a magnetic field of the required strength in a transverse direction to the flowing gas the use of magnet windings which are longitudinal, that is parallel to the MHD channel and which cross over at each end of the MHD channel are required. This configuration is achieved either by the use of flat racetrack-shaped windings or saddle-shaped windings in which the end turns are arched to clear the MHD channel. Normally such a magnet includes halves which are mirror images of each other and are to form a bore in which the MHD channel is located.

Each of the individual conductor turns is provided with electrical insulation and it is desirable that it is constructed so as to minimize relative movement of the individual conductor turns under the action of the magnetic loads. If relative motion occurs between adjacent conductor turns of the winding the resulting frictional work may raise the temperature of the conductor. It has been estimated that temperature increases of a number of degrees are possible where a conductor moves in the order of 0.5 mm. This temperature increase is sufficient to exceed locally the critical temperature and initiate a disturbance which may propagate throughout the coil depending upon heat transfer characteristics of the winding. Accordingly, it is desirable to constrain the windings to avoid any such movement. Historically the method of achieving this has been to impregnate the complete winding or winding pancakes.

Recently it has been proposed that each conductor or possibly several conductors of the coil winding be mounted in a channel provided in a metal or insulator plate. These plates were to be longitudinally located along the MHD conduit. The channels would be designed to constrain the relative and absolute movement of individual conductors to substantially reduce any localized frictional heating. While the use of such plates would provide rigid constraint against movement they would substantially increase the overall size and weight of the MHD magnet assembly. Such increases are particularly important where the magnet must be superconducting, requiring a dewar enclosure which must enclose the magnet and the external containment structure which contains the transverse loads created by the magnetic field.

The three basic Lorentz forces produced by and which act upon the windings in an MHD magnet are the transversely repulsive force ($F_{(y)}$) and laterally attractive force ($F_z$) and the axially repulsive force ($F_x$). The most important force in the consideration of MHD magnetic design is the transverse repulsive forces. This force is substantial and requires a superstructure for containment of the winding against movement away from the axis of MHD channel. The axial repulsive force as well as the laterally attractive force, on the other hand, normally can be carried by the combination of the windings themselves and any external containment structure designed to handle and constrain the transverse force. In some cases the laterally attractive force ($F_z$) can be used to aid in the design of the system embodying the present invention.

Constraint of the transverse forces has been achieved by the use of various external containment structures. For example: ring girders, ring stiffeners, and ring girders with tension rods have been used with circular winding geometries. These same containment structures have also been used with rectangular winding geometries; however, simpler structures have been suggested such as a plurality of beams connected by means of tension rods or plates with shear stops (see, e.g., "Fabrication and Assembly Considerations for a Base Load MHD Superconducting Magnet System," Thome, Pillsbury, Ayers, Hrycaj, IEEE Trans. Vol. MAG 15, January 1979, pages 306-39 309; and "Superconducting Magnets and MHD Test Facility and Base Load Power Plant," Stekly, Thome and Punchard, IEEE Trans., Vol. MAG-13, pages 636–639, 1977). Typically, the structural beams are made of aluminum or stainless steel and are connected across the conduit by means of tension members. Various designs have been utilized to minimize the size and weight of the external containment structure as well as to facilitate fabrication. Fabrication of the magnets is an important design consideration inasmuch as the size of the units for commercial MHD power plants may necessitate that their fabrication be at the use site. The ability to meet precise tolerances is an extremely important consideration in any containment system, but it is particularly important that this precision be obtained in field installation at reasonable costs. Accordingly, it is an object of the present invention to provide a containment structure which prevents both movement of coils subjected to transverse force ($F_y$) and relative or absolute movement of the winding conductor. It is a further object to provide a structure which minimizes the size and weight of the containment structure to reduce to as small as size as possible the dewar vessel. Additionally, it is an object of the invention to provide a transverse containment structure which is easily assembled.

SUMMARY OF THE INVENTION

Generally the invention provides an integral transverse force containment structure. The invention consists of two sets or a pair of spaced apart first and second winding assemblies. In the preferred application each of the first and second assemblies are positioned on either side of the MHD channel. Each winding assembly of the pair consists either of integral winding pancakes or one or more substructural plates, each of which has a channel or channels running the length of the plate into which an individual magnet conductor or several conductors are engagingly placed. Winding pancakes or plates are assembled with means to provide shear transmission from pancake to pancake or from plate to plate. Each of the first and second winding assemblies are joined across the MHD channel by a tension member such as plates or bolts and a means to transmit shear from the winding assembly to the tension member. There may also be an additional tension member within each winding assembly preventing the two winding halves and their components on each side of the MHD channel from separating under the magnetic loads. The winding assemblies are maintained under compression to permit the transmission of shear loads. A substantial amount of the compressive force is provided by the laterally attractive force ($F_z$) of the conductor elements in the two winding halves of the magnet. Additional compression can be provided by bolting the plates together. Alternatively, the shear loads can be transmitted by keying, friction, or adhesive bonding. If adhesive bonding is not used the coefficient of friction between the individual plates or pancakes as well as whether or not the plates or pancakes are keyed to each other determines the compressive forces necessary to permit transmission of the transverse forces to the tension member.

The plates, if used, are made from a material which can support the conductor windings under electromagnetic, thermal, and magnetic loads. Austentic stainless steel and aluminum alloys provide the requisite strength and electrical characteristics at cryogenic temperatures. AISI stainless grades suitable for use include 304, 310 and 316, and Nitronic 40 and aluminum alloys 5083, 2219, 6062, 6061, and 2014. The selection of the materials while not forming a part of the present invention must be made with care since there is a dearth of knowledge of mechanical, electrical, and thermal properties of many materials at cryogenic temperatures.

It will be clear from a perusal of the following detailed description of presently preferred embodiments of the invention taken together with the accompanying illustrative drawings how the objectives of the invention are achieved.

BRIEF DESCRIPTION OF THE DRAWINGS

FIG. 3 is a quarter-section taken along the line of II—II of FIG. 1 in which an integral plate-to-tension member key interlock is utilized to maintain plate compression.

FIG. 4 is a quarter-section as in FIG. 3 but with the plates rotated 90° from that in FIG. 3.

FIG. 5 is a half-section in which the individual plates are positioned in a stepped array to approximate an annular winding distribution showing only a portion of the total number of conductor channels.

FIG. 5a is an enlarged view of the assembly means for the plates shown in FIG. 5.

FIG. 6 is a half-section in which the individual plates are angularly offset showing only a portion of the total number of conductor channels.

FIG. 7 is a half-section having angularly offset plates keyed into a step support located between the winding halves for transmission of the transverse load showing only a portion of the total number of conductor channels.

PRESENTLY PREFERRED EMBODIMENTS

Figure 1:
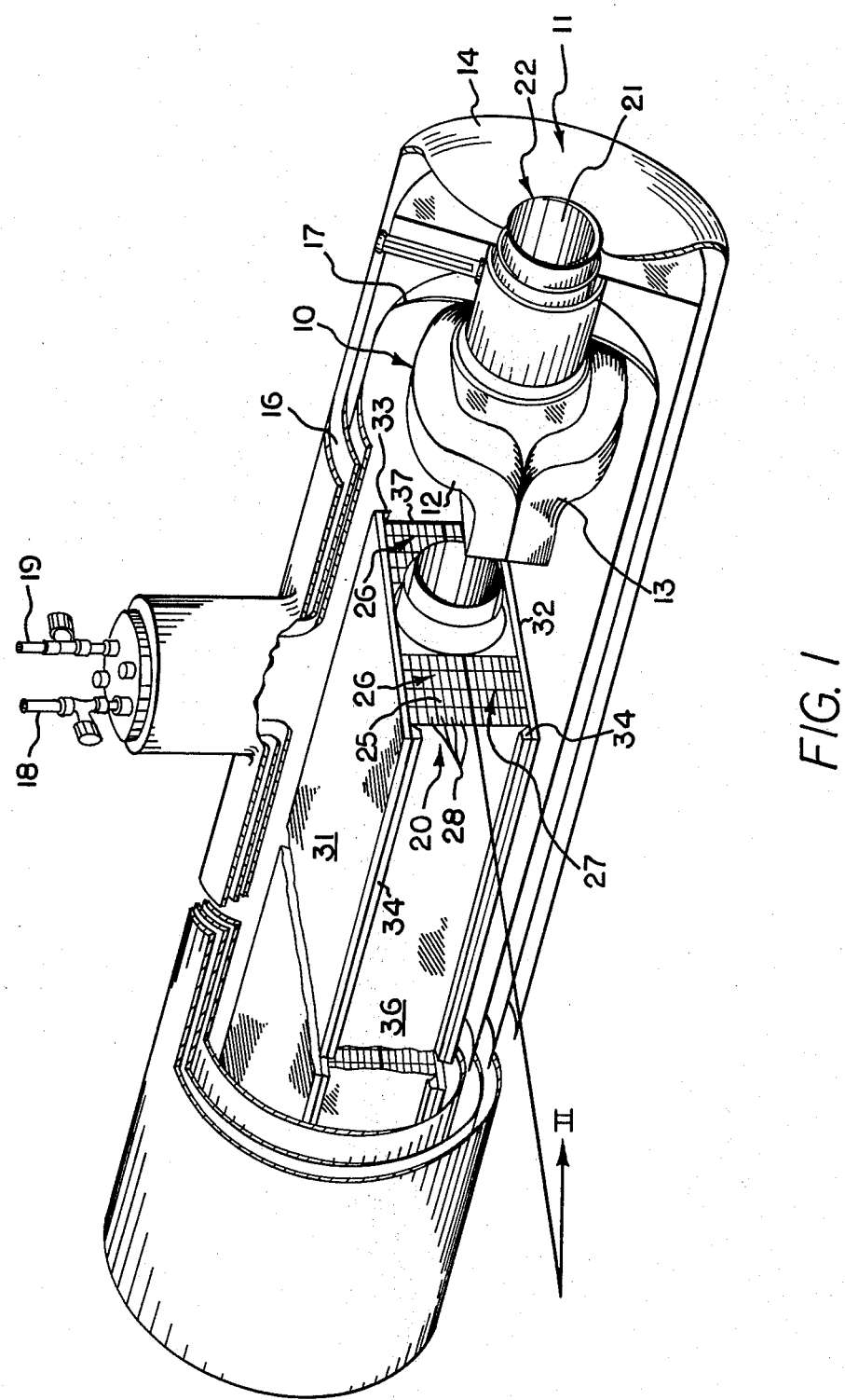
FIG. 1 is a cutaway view of a horizontal warm bore dewar in which a saddle magnet (shown without end or crossover constraint structure) is mounted including the transverse containment means of the present invention.

Referring to FIG. 1, a saddle magnet 10 and its integral transverse containment means 20 are shown mounted in a warm bore dewar vessel 11. As shown however saddle magnet 10 does not include the means for containing the end crossovers and a portion of the upper half 12 and lower half 13. The dewar vessel 11 includes an outer room temperature vessel 14 and radiation shield 16. A liquid helium vessel 17 encloses saddle magnet 10 and integral transverse load containment structure 20. Vessel 17 is designed to withstand stress of internal pressure. Helium vapor cooled power leads 18 and 19 are provided to supply electrical energy to magnet 10. Warm bore 21 of MHD channel 22 extends the length of dewar vessel 11.

The containment structure 20 comprises a set or pair of winding assemblies 26 and 27, respectively. While a first and second pair are shown, it is to be understood that more than one set may be desirable. Each winding assembly 26 and 27 preferably includes several plates 28, each of which includes at least one channel 25 (see FIG. 2) in which a conductor or conductors of magnet 10 are placed. Channels 25 of first pair of winding assemblies 26 engagingly receive the conductors for the first half 12 of magnet 10 and channels 25 of second pair of winding assemblies 27 receive the conductors for the second half 13. Each pair 26a, 26b, and 27a, 27b are positioned along MHD Channel 22 so as to closely adjoin the warm bore 21 contained therein.

Containment structure 20 includes two tension members 31 and 32 which span warm bore 21. The tension members may comprise a plurality of bolts or, preferably, structural plates, as shown. Tension members 31 and 32 each include shear stops 33 and 34 at their outer periphery. Shear stops 33 and 34 are positioned to engage the ends of the substructural plates to transmit the transverse force ($F_y$) from the plates to the tension members.

Associated with the tension members are backing plates 36 and 37. Backing plates 36 and 37 are preferably located adjacent to the outer edge of the plates and extend between the first and second winding assembly. Preferably shear stops 33 and 34 of each tension member engage the respective backing plate. Backing plates 36 and 37 are designed to take the surface shear.

Figure 2:
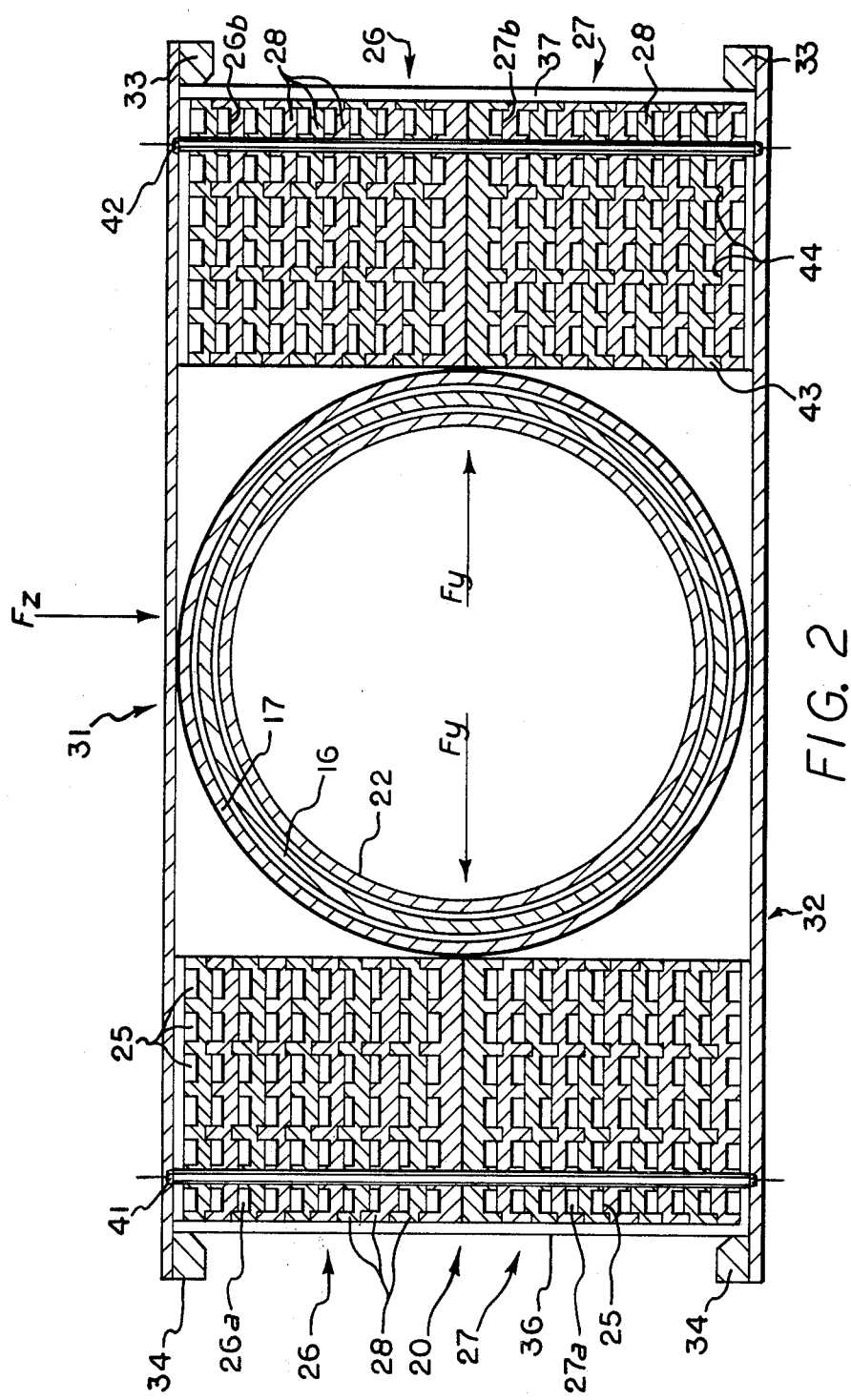
FIG. 2 is a full section taken along line II—II of FIG. 1.

Referring to FIG. 2, containment structure 20 includes one or more bolts 41 and 42 which extend between first winding assemblies 26a and 27a, and second winding assemblies 26b and 27b. The bolt(s) provide compressive forces on individual plates 28 which force is in addition to the attractive force ($F_z$) provided by the magnet windings. Under certain loadings it may be possible to eliminate backing plates 36 and 37 by utilizing compression bolts 41 and 42. In cases where the attractive force ($F_z$) is large, of when the assemblies are bonded together, both bolts 41 and 42 and backing plates 36 and 37 may be eliminated.

To assure transmission of interplate shear, each plate 28 is provided with keys 43 and keyways 44. The keyways are machined and provide for precise alignment of the plate array in the field. The number of keys and keyways is based upon the compressive and shear stresses each key area will be required to carry or transmit. Also, the number of channels 25 in each plate will be a design parameter of the magnet which does not comprise a part of this invention.

With reference to FIG. 3 wherein the last two digits of each reference numeral represents alike element shown in FIG. 1 with the same digits, plates 128 are shown having additional keys 146 which engage keyways 147 in backing plate 137. The keys and keyways provided between the plates and backing plate lock the plates and prevent their separation due to the bending movement imparted by the transverse magnetic force ($F_y$).

While the plates have been shown positioned in horizontally stacked arrays the plates may be otherwise positioned. For example, in FIG. 4 one half of plate set 226 is shown in which individual plates 228 are positioned in a vertically stacked array. In this embodiment backing plate 237 includes keys 246 which engage the keyways 247 of plates 228.

Referring to FIGS. 5 and 5a, the winding assemblies 326 and 327 are shown in which the individual plates 328 are angularly offset to provide stepped array. It is to be noted that while channels 325 are shown only in one of the plates, all plates include such channels. In this embodiment the stepped plates provide a closer approximation to the circular bore 21 than the previously described arrangements. As shown in FIG. 5a, it may be preferable to bolt adjoining plates 328 with a bolt 341 to maintain the required interplate compressive forces. Bolts 341 function in this embodiment as tension members preventing the plates from separating under the bending moments resulting from the transverse forces. It is desirable to position bolts 341 in the outer keyways 344 of an upper plate and an inner keye 343 of the lower plate to which it is bolted. This arrangement may vary however where the key-keyway pattern varies as well as the number of channels 25 that must be provided.

The same magnetic effect as achieved in the embodiment described in connection with FIG. 5 may be accomplished by positioning the sets of plates in a vertically offset manner. As shown in FIG. 6, the pair of winding assemblies 426 and 427 respectively are angularly offset in vertically stacked arrays. It is desirable to include an while backing plate 437a as well as outer blocking plate 437. While not shown the individual plates may be keyed as shown in FIG. 4. Also, as in FIG. 4, only a portion of the total number of channels 425 is shown. In practice, each plate 428 would include a number of channels 425.

Plates 428 are preferably welded together during the winding of the coil to provide a fully rigid structure which is capable of carrying tensile bending. Alternatively, the magnetic field direction can be used to align the plates of each winding assembly in the approximate line of action of the resultant force. This transverse force is transmitted from the plates to a stepped support 524 centrally located between the winding assemblies 526 and 527 as shown in FIG. 7. Support 524 is connected to inner backing plate 537 which transmits the force to the tension members 531 and 532.

In the embodiment shown in FIG. 7, backing plate 537 is bifurcated and includes gusset plate 548. Also, it is desirable to rigidify the connection between tension members 531 and 532 and the winding assemblies. This may be done by using corner braces 551 and 552.

It should be noted that since the backing plates are located inside of the winding assembly and thus the windings, there is a penalty in ampere turns. However, this penalty is small when compared to the overall size reduction afforded by this embodiment.

While presently preferred embodiments of the invention have been shown and described in particularly, the invention may be otherwise embodied within the scope of the appended claims.

What is claimed is:

1. An integral magnetic load containment structure comprising
   a. a pair of first and second magnet winding assemblies positioned to define a bore there between, each of said winding assemblies including at least one channel throughout its length to engagingly receive at least one magnet conductor,
   b. at least one pair of tension members spanning bore space and operably connected to the first and second assemblies of the respective pair to receive transverse forces transmitted from each pair of first and second assemblies to the respective tension member; and
   c. a first backing means connected to the first magnet winding assemblies of said pair and a second backing means connected to the second magnet winding assemblies of said pair, each of said backing means being adapted to take shear forces transmitted from said winding assemblies.

2. A containment structure as claimed in claim 1 wherein said first and second winding assemblies comprise a plurality of plates.

3. A containment structure as claimed in claim 1 wherein said bore comprises a magnetohydrodynamic channel.

4. A containment structure as claimed in claim 1 wherein said tension members comprise plates having stop means at their respective ends adapted to engage an associated winding assembly.

5. A containment structure as claimed in claim 1, 2, or 4 wherein said backing means comprises first and second plates in contact with respective winding assemblies, each of said plates engaging said tension members.

6. A containment structure as claimed in claim 1, 2 or 4 wherein said backing means comprise bolts securing adjacent winding plates.

7. A containment structure as claimed in claim 2 or 4 wherein each of said plates within an assembly is keyed into an adjacent plate within that assembly.

8. A containment structure as claimed in claims 2 or 4 wherein said assembly plates are keyed into an associated backing means.

9. A containment structure as claimed in claim 2 wherein each plate of said winding assemblies is offset from the next adjacent plate whereby said pair of assemblies define an annular bore therebetween.

10. A containment structure as claimed in claim 2 wherein said plates of each winding assembly are angularly offset.

11. A containment structure as claimed in claim 10 and including a pair of stepped support members for receiving the angularly offset plates.

12. A structure integral with a magnet for containing transverse magnetic loads comprising
    a. a pair of first and second magnet winding assemblies, each of said first and second assemblies being spaced apart, but abutting the like assembly of the other pair, each of said winding assembly consisting of a plurality of plates,
    b. at least one channel in each of said plates, said channel extending the length of said plate and adapted to engagingly receive at least one magnet conductor, c. at least one pair of tension members, said first member connecting in spaced apart relation the first and second winding assemblies of the first pair and said second member connecting in spaced apart relation the first and second winding assemblies of the second pair, each of said tension members being connected to associated assemblies so that transverse forces generated in said winding assemblies are transmitted to said tension members, d. first and second surface shear means operably connected to the first winding assemblies and the second winding assemblies respectively.

13. A structure as claimed in claim 12 including means for compressively joining respective first and second winding assemblies.

14. A structure as claimed in claim 12 or 13 wherein each of said winding plates of an assembly is keyed into an adjacent winding plate of that assembly.

15. A structure as claimed in claim 12 or 13 wherein each of said winding plates includes a plurality of conductor channels, each of said channels being adapted to engagingly receive a magnet conductor.

16. A structure as claimed in claim 12 including a saddle magnet, said saddle magnet comprising first and second halves of conductors, said conductors of said first half being positioned in the channels of the first and second winding assemblies of one of the pair and the second conductors of said half being positioned in the channels of the first and second winding assemblies of the other pair.

17. A structure as claimed in claim 16 including a magnetohydrodynamic channel positioned in the space between the first and second winding assemblies.

18. A containment structure as claimed in claim 2 wherein each of said plates within an assembly is keyed into an adjacent plate within that assembly and wherein said assembly plates is each keyed into as associated backing means.

19. A structure as claimed in claim 16 wherein each winding plate includes a plurality of conductor channels.

* * * * *